United States Patent [19]

Takahashi

[11] Patent Number: 4,971,173

[45] Date of Patent: Nov. 20, 1990

[54] REAR-WHEEL STEERING SYSTEM OF A MOTOR VEHICLE

[75] Inventor: Akira Takahashi, Tokyo, Japan

[73] Assignee: Fuji Jukogyo Kabushiki Kaisha, Tokyo, Japan

[21] Appl. No.: 429,420

[22] Filed: Oct. 31, 1989

[30] Foreign Application Priority Data

Nov. 2, 1988 [JP] Japan .................................. 63-277676

[51] Int. Cl.$^5$ ........................... B62D 5/04; B62D 6/02
[52] U.S. Cl. .................................... 180/140; 180/142; 280/91; 364/424.01
[58] Field of Search .................. 280/91; 180/140, 142; 364/424.01

[56] References Cited

U.S. PATENT DOCUMENTS

| | | | |
|---|---|---|---|
| 4,476,529 | 10/1984 | Nakamura et al. | 180/142 X |
| 4,645,025 | 2/1987 | Ohe et al. | 180/142 X |
| 4,836,319 | 6/1989 | Haseda et al. | 280/91 X |
| 4,869,335 | 9/1989 | Takahashi | 280/91 X |

FOREIGN PATENT DOCUMENTS

| | | | |
|---|---|---|---|
| 3642049 | 6/1987 | Fed. Rep. of Germany | 280/91 |
| 0143769 | 8/1984 | Japan | 280/91 |
| 0067669 | 4/1986 | Japan | 280/91 |

Primary Examiner—Charles A. Marmor
Assistant Examiner—Mitchell Bompey
Attorney, Agent, or Firm—Beveridge, DeGrandi & Weilacher

[57] ABSTRACT

A system for steering rear wheels of a motor vehicle has a control unit which sets a direction and an angle in which the rear wheels must be steered based on front-wheel operation. A rear-wheel steering angular deviation signal and a desired rear-wheel steering speed signal are produced in the control unit and each signal has a positive or negative direction component. The rear wheels are steered when the two components are the same as each other, whereas not steered when the components are opposite from each other.

5 Claims, 5 Drawing Sheets

REAR-WHEEL STEERING SYSTEM OF A MOTOR VEHICLE

BACKGROUND OF THE INVENTION

The present invention relates to a system for steering rear wheels of a motor vehicle.

There have been developed several rear-wheel steering systems for steering rear wheels by operating a rear-wheel steering actuator in response to a desired rear-wheel steering angle which is set by a control unit based on motor vehicle turn data such as a front-wheel steering force and angle, lateral acceleration, yaw rate and the like and on motor vehicle driving data in a longitudinal direction such as a vehicle speed, acceleration and deceleration.

Japanese Patent Laid-Open No. 63-125476 discloses a method to incorporate a velocity feedback control into rear-wheel steering control so as to improve response of the rear-wheel steering control when an electric motor is applied to the actuator mentioned above.

The conventional method disclosed above is to drive the rear-wheel steering actuator or the electric motor in such a manner that the control unit calculates a desired rear-wheel steering angle $\overline{\delta r}$ by means of data regarding the front-wheel steering force and the vehicle speed, determines a desired rear-wheel steering speed $\overline{\omega}$ in accordance with the calculated angle $\overline{\delta r}$ and the magnitude of a deviation $\epsilon$ calculated by means of an actual rear-wheel steering angle $\delta r$ detected by a rear-wheel steering angle detecting means and drives the actuator or the motor in a direction in which $\epsilon$ becomes zero in response to an error $\xi$ of an actual rear-wheel steering speed detected by a rear-wheel steering speed detecting means from the determined $\overline{\omega}$.

However, due to inaccurate sensors for setting the desired rear-wheel steering angle $\overline{\delta r}$ and disturbance, $\overline{\delta r}$ may not provide smooth steering operation with respect to actual steering operation (operation of a steering wheel). Furthermore, if the response of a control system (particularly the actuator) is worse, the deviation $\epsilon$ of the desired rear-wheel steering angle $\overline{\delta r}$ from the actual rear-wheel steering angle $\delta r$ may be a large value. In that case, the desired rear-wheel steering speed $\overline{\omega}$ is also set to a large value in accordance with the deviation $\epsilon$. This also may not provide smooth steering with respect to actual steering operation. There is, thus, the drawback that drivers cannot have smooth steering.

SUMMARY OF THE INVENTION

The object of the present invention is to provide a steering system for rear wheels and that overcomes the drawback mentioned above.

According to the present invention, there is provided a rear-wheel steering system in which rear wheels are steered in accordance with a direction and an angle in which the rear wheels must be steered and which are set by a control unit based on front-wheel steering operation comprising a steering wheel angular velocity detecting means which detects a turning direction and speed of a steering wheel and applies data representing the steering wheel angular velocity to the control unit. Under this unit, a rear-wheel steering speed is controlled so as to follow a desired rear-wheel steering speed which is set on the basis of the steering wheel angular velocity. On the other hand, the rear wheels are not steered if the direction in which the rear wheels must be steered and that of the desired rear-wheel steering speed are different from each other.

Accordingly, when a driver does not turn the steering wheel, the desired rear-wheel steering speed is zero so that the rear wheels are not steered. Therefore, the rear wheels are not unnecessarily steered by noise signals generated in sensors for detecting front-wheel steering operation and vehicle speed. Only when the driver turns the steering wheel, the slower/the quicker the steering wheel is turned, the slower/the quicker the rear wheels are steered. This provides the driver with smooth rear-wheel steering operation.

The other objects and features of this invention will become understood from the following description with reference to the accompanying drawings.

DETAILED DESCRIPTION OF THE PREFERRED EMBODIMENT

A preferred embodiment of the present invention will now be described with reference to the accompanying drawings.

Figure 2:
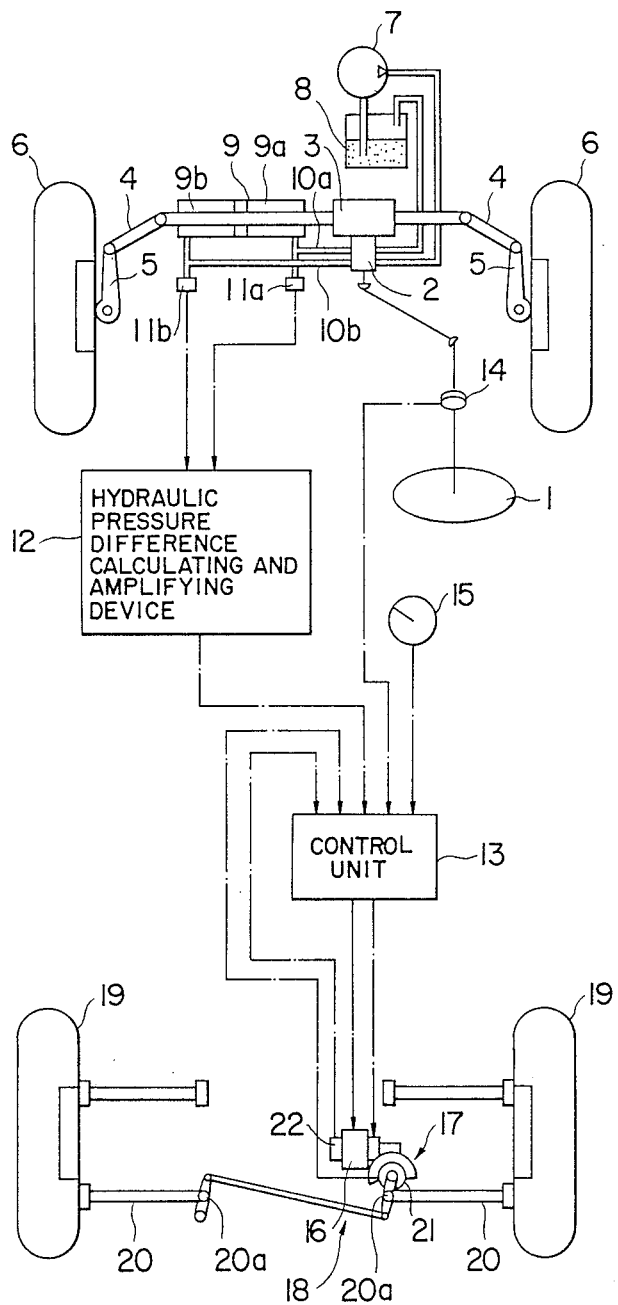
FIG. 2 is a schematic plan view of a rear-wheel steering system to which the present invention is applied.

FIG. 2 shows an example of a rear-wheel steering system provided with a hydraulic power steering system to which the present invention is applied comprises a steering wheel 1, a control valve 2, a gear box 3 for steering front wheels, a pair of tie rods 4, a pair of knuckle arms 5 and a pair of front wheels 6. When the steering wheel 1 is turned, the pair of front wheels 6 are steered via the gear box 3 and the pairs of tie rods 4 and knuckle arms 5 and also the control valve 2 is operated in dependency on steering torque of the steering wheel 1. Either of right and left oil chambers 9a and 9b of a hydraulic power cylinder 9 is supplied with oil from a hydraulic pump 7 operated by an engine not shown via the control valve 2, and either of right and left oil pipes 10a and 10b, so that a hydraulic assist force is generated in a steering direction so as to reduce the steering effort on the steering wheel 1. There is also provided a reservoir tank 8.

On the way of the right and left oil pipes 10a and 10b, right and left hydraulic pressure sensors 11a and 11b are provided respectively for detecting respective hydraulic pressures in the pipes 10a and 10b. The detected hydraulic pressures are converted into electric signals which are fed to a steering hydraulic pressure difference calculating and amplifying device 12 which calculates a steering assist force from the difference of both output signals of the hydraulic pressure sensors 11a and 11b and supplies a signal representing the steering assist force to a control unit 13.

The system is provided with a steering wheel angular velocity sensor 14 which detects the steering direction and an angular velocity of the steering wheel 1 and supplies a signal representing the steering-wheel angular velocity to the control unit 13. A vehicle speed sensor 15 is provided for detecting a vehicle speed and supplying a signal representing the vehicle speed to the control unit 13.

An electric motor 16 is a rear-wheel steering actuator whose rotation is transferred to a linkage 18 as a rear-wheel steering mechanism via a reduction gear mechanism consisting of a worm gear, a worm wheel and the like The linkage 18 causes, for example, vehicle body lateral movement-supporting points 20a of rear lateral links 20 to move laterally which is either one pair of front and rear lateral links as suspension arms of the rear wheels 19 which are thus steered. As to the rear-wheel steering mechanism, any conventional mechanism, such as a rack-and-pinion mechanism may be applied.

A rear-wheel steering angle sensor 21 is provided for detecting an actual steering angle of the rear wheels 19 by means of, such as a rotational angle of a rotary shaft of the reduction gear mechanism 17. A rear-wheel steering speed sensor 22 is provided for detecting a rear-wheel steering speed by means of a rotational speed of the electric motor 16. Respective data detected by the sensors 21 and 22 is supplied to the control unit 13.

Figure 1:
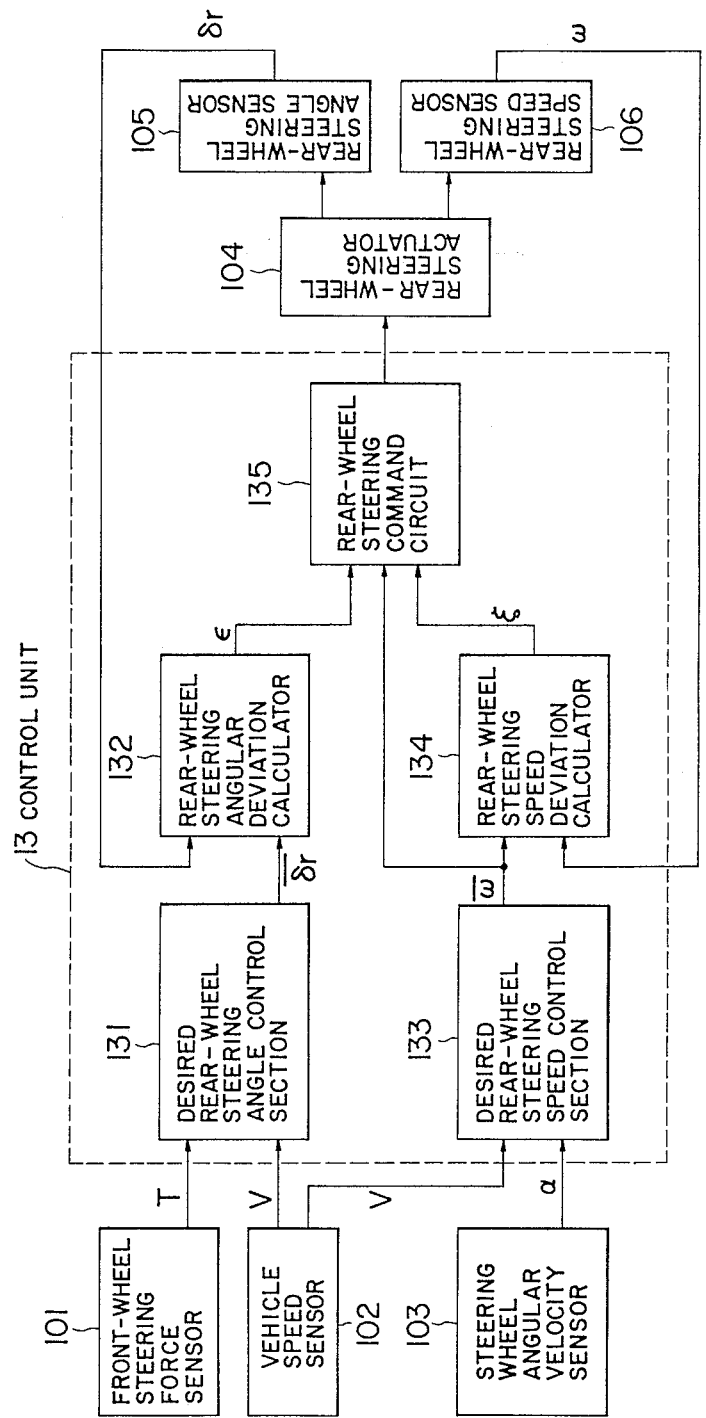
FIG. 1 is a block diagram showing a control of an embodiment of the present invention.

The operation of the control unit 13 is described hereinafter with reference to a block diagram shown in FIG. 1. Referring to FIG. 1, a front-wheel steering force sensor 101 consists of the hydraulic pressure sensors 11a and 11b and the steering hydraulic pressure difference calculating and amplifying device 12 shown in FIG. 2. An electric power steering system with an electric motor for generating a steering assist force may detect a front-wheel steering force in dependency on motor torque obtained from a value of a current flowing through the motor. In case of a motor vehicle without a power steering system, a steering-torque sensor for detecting the steering effort may be provided. Furthermore, it is also applicable to provide a system having any means to detect front-wheel steering force in dependency on a lateral force at the front-wheel.

A vehicle speed sensor 102, a steering wheel angular velocity sensor 103, a rear-wheel steering actuator 104, a rear-wheel steering angle sensor 105 and a rear-wheel steering speed sensor 106 shown in FIG. 1 correspond to the vehicle speed sensor 15, the steering wheel angular velocity sensor 14, the electric motor 16, the rear-wheel steering angle sensor 21 and the rear-wheel steering speed sensor 22 shown in FIG. 2.

When the front-wheel steering force sensor 101 produces a detection signal T, a desired rear-wheel steering angle control section 131 sets a desired rear-wheel steering angle $\overline{\delta r}$ by means of the signal T and a vehicle speed signal V produced by the vehicle speed sensor 102. A rear-wheel steering angular deviation calculator 132 calculates a deviation $\epsilon$ of the desired rear-wheel steering angle $\overline{\delta r}$ from an actual rear-wheel steering angle $\delta r$ detected by the rear-wheel steering angle sensor 105 by means of their values. For example, if $\overline{\delta r}$ is 1° to the right and $\delta r$ is 0.9° to the right, the deviation $\epsilon$ is calculated into 0.1° to the right.

At the same time as what is mentioned above, a steering wheel angular velocity signal $\alpha$ detected by the steering wheel angular velocity sensor 103 is fed to a desired rear-wheel steering speed control section 133 in which a desired rear-wheel steering speed $\overline{\omega}$ is set by means of the signal and the vehicle speed signal V produced by the vehicle speed sensor 102. A rear-wheel steering speed deviation calculator 134 calculates a deviation $\xi$ of the desired rear-wheel steering speed $\overline{\omega}$ from an actual rear-wheel steering speed $\omega$ detected by the rear-wheel steering speed sensor 106.

A rear-wheel steering command circuit 135 instructs the rear-wheel steering actuator 104 to steer the rear wheels in a direction and a speed in which $\epsilon$ and $\xi$ become zero respectively on the basis of the deviation $\epsilon$ of the rear-wheel steering angle, the desired rear-wheel steering speed $\overline{\omega}$ and the deviation $\xi$ of the rear-wheel steering speed.

The rear-wheel steering command circuit 135 performs controlling which will be explained hereinafter based on $\epsilon$, $\overline{\omega}$ and $\xi$ mentioned above.

The rear-wheel steering command circuit 135 determines whether $\epsilon$ and $\overline{\omega}$ are in the same direction as each other on the basis of input signals which represent the deviation $\epsilon$ of the rear-wheel steering angle and the desired rear-wheel steering speed $\overline{\omega}$ respectively and supplies a control signal to the rear-wheel steering actuator 104 to steer the rear wheels so that the actual rear-wheel steering angle $\delta r$ and the actual rear-wheel steering speed $\omega$ become the desired rear-wheel steering angle $\overline{\delta r}$ and speed $\overline{\omega}$ respectively if $\epsilon$ and $\overline{\omega}$ are in the same direction as each other.

The rear-wheel steering actuator 104 is driven under a voltage Va which is obtained by adding a motor-drive voltage V$\overline{\omega}$ to a voltage V$\xi$, those of which correspond to the desired rear-wheel steering speed $\overline{\omega}$ and the rear-wheel steering speed deviation $\xi$ respectively. (The voltage V$\xi$ is to compensate the deviation $\xi$.)

Figure 5:
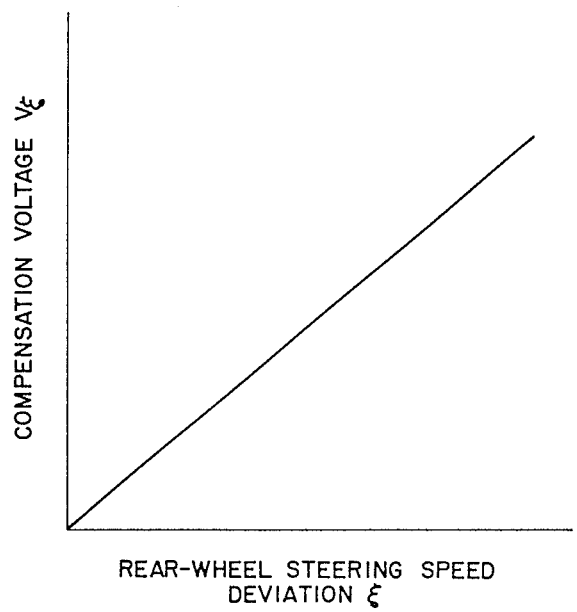
FIG. 5 is a graph showing a characteristic of a compensation voltage for compensating a rear-wheel steering speed deviation.

Shown in a graph of FIG. 5 is a relationship between the rear-wheel steering speed deviation $\xi$ and the compensation voltage V$\xi$.

The rear wheels are not steered if $\epsilon$ and $\overline{\omega}$ are in a different direction each other or either of them is zero.

For example, it is assumed that, by turning a steering wheel to the right, the desired rear-wheel steering angle $\overline{\delta r}$ is set to 1° to the right, the actual rear-wheel steering angle $\delta r$ is set to 0.9° to the right, so that the deviation $\epsilon$ of the rear-wheel steering angle is calculated at 0.1° to the right and $\alpha$ is in the right direction and the desired rear wheel steering speed $\overline{\omega}$ is set to 2°/sec to the right. Due to $\epsilon$ and $\overline{\omega}$ being in the right direction, the rear-wheel steering instruction circuit 135 produces an instruction signal so as to steer the rear wheels in 0.1° to the right at a speed of 2°/sec.

Therefore, when $\epsilon$ and $\overline{\omega}$ are in the same direction as each other, if a steering angular velocity is low/high, rear-wheels are steered slowly/speedily so as to obtain the desired rear-wheel steering angle. On the other hand if $\overline{\omega}$ is not in the right direction but zero or in the left direction when $\epsilon$ is calculated at 0.1° to the right as mentioned above, the rear-wheel steering command circuit 135 does not produce the instruction signal and the rear wheels are not steered.

Figure 3:
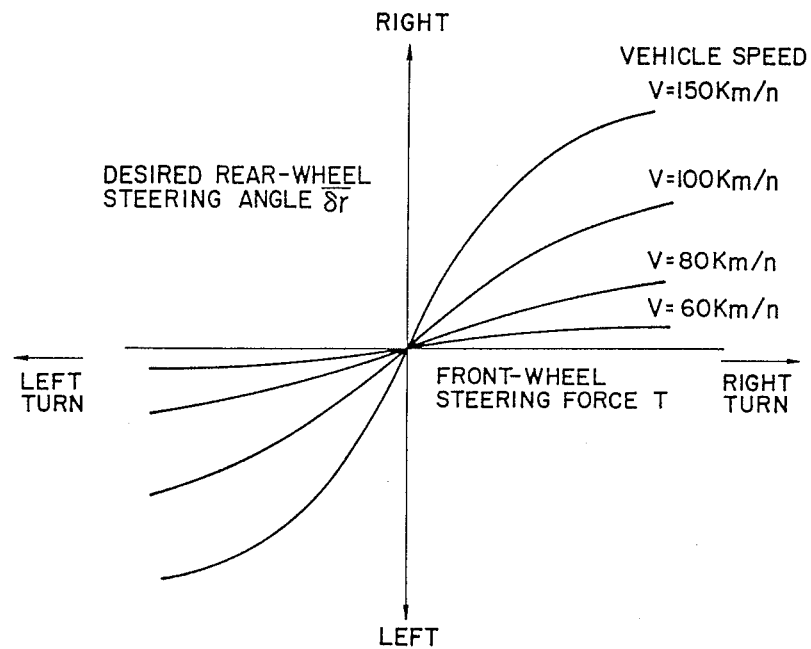
FIG. 3 is a graph showing a characteristic of a desired rear-wheel steering angle.

The desired rear-wheel steering angle $\overline{\delta r}$ must be in the same direction as exerting direction of the front-wheel steering force T and set by means of a function of the front-wheel steering force T and the vehicle speed in which the bigger the front-wheel steering force T and the higher the vehicle speed, the larger $\overline{\delta r}$. As is shown in a graph of FIG. 3, when the vehicle speed V exceeds 60 km/h, the desired rear wheel steering angle $\overline{\delta r}$ increases as a monotone increasing function of the front-wheel steering force T and the vehicle speed V.

Figure 4:
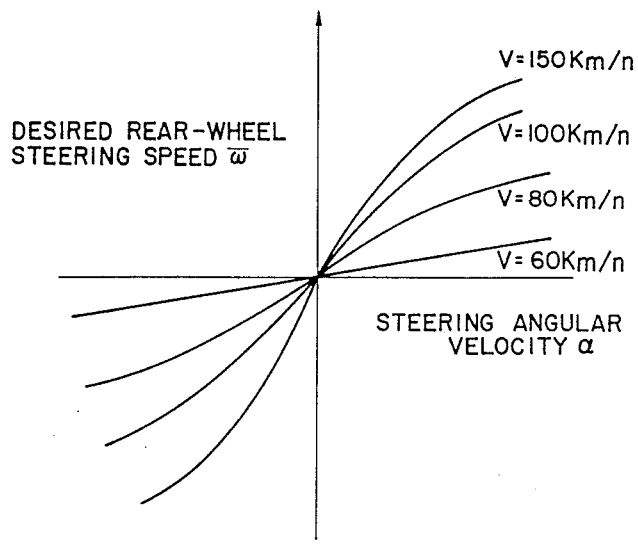
FIG. 4 is a graph showing a characteristic of a desired rear-wheel steering speed.

The desired rear-wheel steering speed $\overline{\omega}$ must be in the same direction as that of the steering angular velocity $\alpha$ and set by means of a function of the steering angular velocity u and the vehicle speed in which the higher α and the vehicle speed V, the higher $\bar{\omega}$. As is shown in a graph of FIG. 4, the desired rear-wheel steering speed $\bar{\omega}$ increases as a monotone increasing function of the steering angular velocity α and the vehicle speed V.

Figure 6:
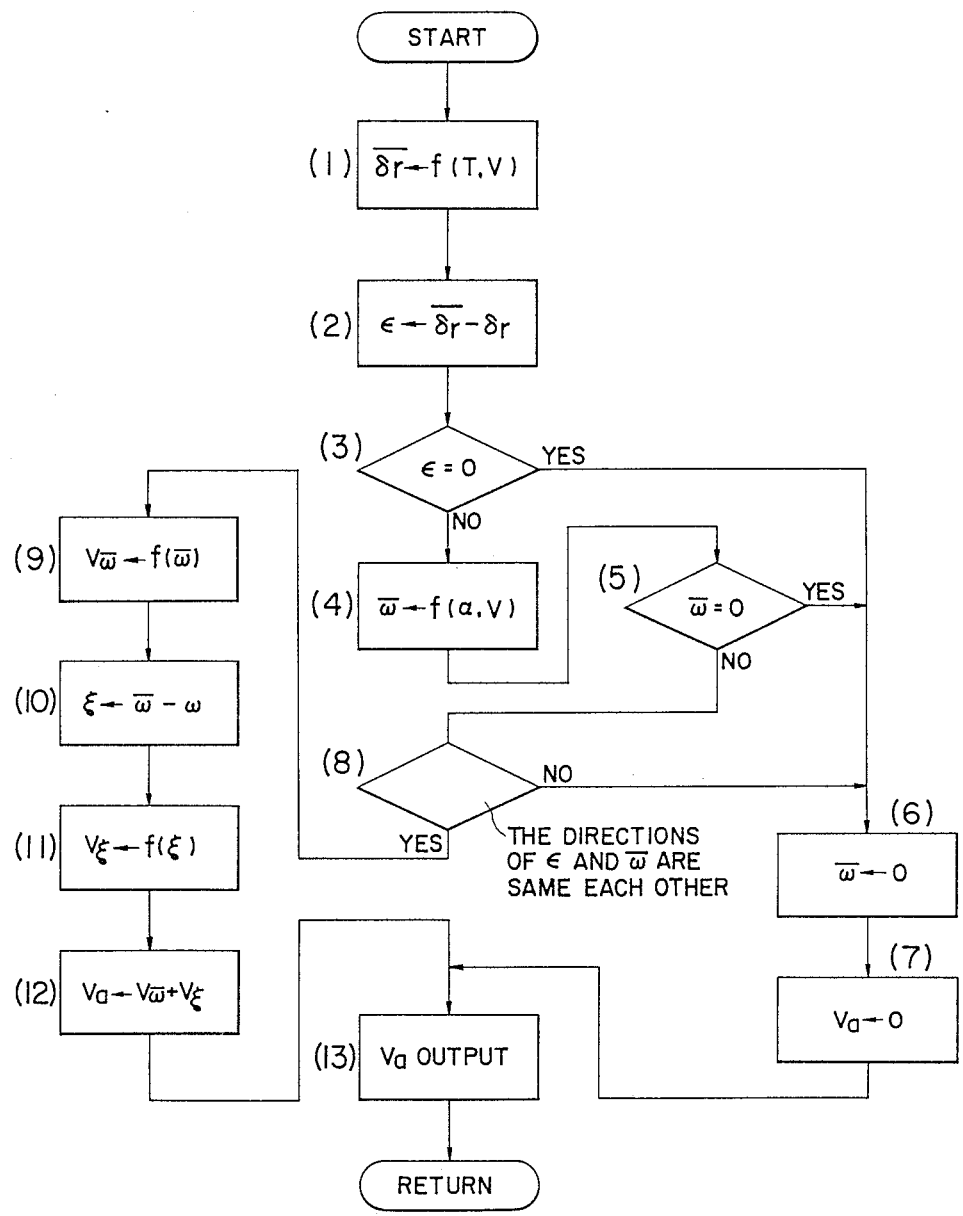
FIG. 6 is a flowchart showing a control process of the embodiment of the present invention.

FIG. 6 is a flow chart showing the control process proceeded in the control unit 13 explained above. In the FIGURE, the desired rear-wheel steering angle $\bar{\delta r}$ is set by means of the function of the front-wheel steering force T and the vehicle speed V in STEP (1). The rear-wheel steering angular deviation ε is, calculated by means of $\bar{\delta r}$ and δr in STEP (2).

If ε=0 in STEP (3), the sequence jumps to STEP (6) where the desired rear-wheel steering speed $\bar{\omega}$ is set to zero and goes to STEP (7) where rear-wheel steering actuator driving voltage Va is also set to zero, then jumps to STEP (13) where the voltage Va is not fed out and the rear wheels are not steered.

On the other hand, if ε≠0 in STEP (3), the desired rear-wheel steering speed $\bar{\omega}$ is set by means of the function of the steering wheel angular velocity α and the vehicle speed V in STEP (4). If $\bar{\omega}$=0 in STEP (5), the sequence goes to STEP (6) and (7) and jumps to (13), the rear wheels are, thus, not steered same as in case of ε=0. If $\bar{\omega}$≠0 in STEP (5), the sequence jumps to STEP (8) where the directions of ε and $\bar{\omega}$ are checked whether they are same. If not, the sequence returns to STEP (6) and (7) and jumps to (13), rear-wheel steering operation is not conducted.

If the directions of ε and $\bar{\omega}$ are the same in STEP (8), the sequence moves on to STEP (9) where the motor driving voltage V$\bar{\omega}$ is generated. Next to STEP (10), the rear-wheel steering speed deviation ξ is calculated by means of $\bar{\omega}$ and ω. In STEP (11), a compensation voltage Vξ is generated to correspond to ξ. The actuator driving voltage Va is obtained by adding V$\bar{\omega}$ to Vξ in STEP (12). Accordingly, the voltage Va is fed out in STEP (13) so as to steer the rear wheels.

Although the embodiment explained above discloses the system in which the desired rear wheel steering angle $\bar{\delta r}$ is set by means of the front-wheel steering force and the vehicle speed, as for another embodiment, a front-wheel steering angle detecting means may be provided, thereby setting the desired rear-wheel steering angle by means of a front-wheel steering angle and the vehicle speed. The desired rear-wheel steering angle $\bar{\delta r}$ must be in the same direction as that of the front-wheel steering angle δf and set by means of a function of the front-wheel steering angle δf and the vehicle speed in which the larger δf and the higher the vehicle speed, the larger $\bar{\delta r}$.

According to the present invention as explained above, the rear-wheel steering speed is controlled so as to follow the desired rear wheel steering speed which is set on the basis of the steering wheel angular velocity. On the other hand, the rear wheel are not steered if the direction in which the rear wheels must be steered and that of the desired rear-wheel steering speed are different from each other.

Accordingly, the rear wheels are not unnecessarily steered by noise signals generated in the means for detecting factors for setting a direction and an angle in which the rear wheels must be steered. The noise signals are generated due to such as kickback while a motor vehicle is running on an irregular road. Furthermore, when it becomes difficult to follow the desired rear-wheel steering angle for the rear wheels due to any abnormal loads and the desired rear-wheel steering angle (corresponding to ε in the embodiment) considerably increases, if there is no steering operation, the desired rear-wheel steering speed is zero so that the rear wheels are not steered.

Therefore, loads put on the rear-wheel steering actuator or other devices in the rear-wheel steering system are minimized. The quicker/slower a driver turns a steering wheel, the quicker/slower the rear wheel are steered. When the steering wheel is not turned, the rear wheels are not freely steered. Accordingly, the rear wheels are smoothly steered only when the steering wheel is turned.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A steering system for steering rear wheels of a motor vehicle including front-wheel steering parameter detector means for detecting a front-wheel steering parameter and producing a front-wheel steering force parameter signal, vehicle speed detector means for detecting a vehicle speed and producing a vehicle speed signal, steering wheel angular velocity detector means for detecting a steering wheel angular velocity and producing a steering wheel angular velocity signal, actual rear-wheel steering angle detector means for detecting an actual rear-wheel steering angle and producing an actual rear-wheel steering angle signal, rear-wheel steering speed detector means for detecting rear-wheel steering speed and producing an actual rear-wheel steering speed signal, a control unit for setting a direction and an angle in which the rear wheels must be steered responsive to said front-wheel steering parameter signal, said actual rear-wheel steering angle signal, said steering wheel angular velocity signal, said actual rear wheel steering speed signal and said vehicle speed signal and an actuator for steering the rear wheels on the basis of said direction and angle, said control unit comprising:

first means for setting a desired rear-wheel steering angle and generating a desired rear-wheel steering angle signal responsive to said front-wheel steering parameter signal and vehicle speed signal, said desired rear-wheel steering varies according to said front-wheel steering force and said vehicle speed;

second means for calculating an angular deviation of said desired rear-wheel steering angle signal from said actual rear-wheel steering signal and producing an angular deviation signal, said rear-wheel steering angular deviation having either direction component;

third means for setting a desired rear-wheel steering speed having either direction components and producing a desired rear-wheel setting speed responsive to said steering wheel angular velocity signal and vehicle speed signal, said desired rear-wheel steering speed signal varies according to said steering wheel angular velocity signal and said vehicle speed signal; and rear-wheel steering instruction means for supplying a rear-wheel steering instruction signal to said actuator responsive to said rear-wheel steering angular deviation signal and desired rear-wheel steering speed signal when both direction components of the angular deviation and the desired rear-wheel steering speed are the same as each other and for not supplying said rear-wheel steering instruction signal to said actuator when said both direction components are opposite from each other.

2. The system according to claim 1, said control unit further comprising means for calculating a speed deviation of said desired rear-wheel steering speed from said rear-wheel steering speed and supplying a speed deviation signal to said rear-wheel steering instruction means; said rear-wheel steering instruction means supplying a signal obtained by adding said desired rear-wheel steering speed to said speed deviation to said actuator when said both direction components are the same as each other and not supplying said signal to said actuator when said both direction components are opposite from each other.

3. The system according to claim 2, wherein said speed deviation signal varies from zero as a linear function of said desired rear-wheel steering speed signal and rear-wheel steering speed signal.

4. The system according to claim 1, wherein said front-wheel steering parameter is a front-wheel steering angle.

5. The system according to claim 1, wherein said front-wheel steering parameter is a front-wheel steering force.

* * * * *